United States Patent
Bosen et al.

(10) Patent No.: US 10,052,984 B1
(45) Date of Patent: Aug. 21, 2018

(54) EXTENDED STROKE ENERGY ATTENUATOR

(71) Applicant: Armorworks Holdings, Inc., Chandler, AZ (US)

(72) Inventors: David A. Bosen, Tempe, AZ (US); Joshua Steven Campbell, Gilbert, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 0 days.

(21) Appl. No.: 15/471,529

(22) Filed: Mar. 28, 2017

(51) Int. Cl.
*B60N 2/42* (2006.01)
*B60N 2/427* (2006.01)
*B64D 11/06* (2006.01)

(52) U.S. Cl.
CPC .......... *B60N 2/4242* (2013.01); *B60N 2/427* (2013.01); *B64D 11/0619* (2014.12)

(58) Field of Classification Search
CPC ........ B60N 2/42; B60N 2/4242; B60N 2/427; B60N 2/42709; B60N 2/503; B60N 2/544; B60N 2/4214; B64D 25/04; B64D 11/0619; F41H 7/046; F16F 16/128; F16F 7/123
USPC .............. 297/216.1, 216.13, 216.14, 216.15, 297/216.16, 216.17
See application file for complete search history.

(56) References Cited

U.S. PATENT DOCUMENTS

| 4,128,217 | A | * | 12/1978 | Mazelsky | B64D 25/04 188/377 |
| 4,523,730 | A | * | 6/1985 | Martin | B64D 25/04 244/122 R |
| 4,525,010 | A | * | 6/1985 | Trickey | B64D 25/04 244/122 R |
| 5,273,240 | A | * | 12/1993 | Sharon | B60N 2/4242 188/271 |
| 5,558,301 | A | | 9/1996 | Kerdoncuff et al. | |
| 5,676,336 | A | * | 10/1997 | Nefy | B64D 25/04 244/118.6 |
| 5,788,185 | A | * | 8/1998 | Hooper | B64D 11/0619 244/118.6 |
| 6,179,380 | B1 | * | 1/2001 | Hoffman | B60N 2/4242 297/216.1 |
| 7,938,485 | B1 | * | 5/2011 | Perciballi | B60N 2/24 297/216.1 |
| D657,312 | S | * | 4/2012 | Aragon | B64D 25/04 D13/118 |
| 8,342,300 | B2 | | 1/2013 | Guillon | |
| 8,403,410 | B1 | | 3/2013 | Pinger et al. | |
| 8,550,553 | B1 | * | 10/2013 | Clark | B60N 2/4242 297/216.16 |
| 8,561,748 | B1 | | 10/2013 | Hahn et al. | |

(Continued)

*Primary Examiner* — Theodore V Adamos
(74) *Attorney, Agent, or Firm* — James L. Farmer

(57) ABSTRACT

Methods and apparatus are provided for an energy attenuating vehicle seating system that includes a seat configured for guided motion relative to a vehicle compartment over a stroking distance, and an energy attenuating component with a first end attached to the seat, a second end configured for attachment to the vehicle compartment, and an intermediate point configured for guided motion relative to the vehicle compartment. The energy attenuating component is configured to remain rigid and prevent the seat from moving under loads less than a predetermined threshold value, yet deform in a progressive, predictable manner in response to a load exceeding the threshold.

14 Claims, 4 Drawing Sheets

(56) References Cited

U.S. PATENT DOCUMENTS

| | | | | |
|---|---|---|---|---|
| 8,678,465 | B1* | 3/2014 | Aragon | B60N 2/24 244/122 R |
| 8,840,163 | B1* | 9/2014 | Wilhelm | A61G 3/085 296/19 |
| 8,939,502 | B2 | 1/2015 | Grant et al. | |
| 9,132,753 | B1* | 9/2015 | Campbell | B60N 2/995 |
| 9,221,361 | B1 | 12/2015 | Platt et al. | |
| 9,272,657 | B1 | 3/2016 | Perciballi et al. | |
| 2008/0156602 | A1* | 7/2008 | Hiemenz | B60N 2/4242 188/267.1 |
| 2009/0267390 | A1* | 10/2009 | Honnorat | B60N 2/4242 297/216.16 |
| 2009/0267391 | A1* | 10/2009 | Honnorat | F16F 1/025 297/216.17 |
| 2013/0328364 | A1* | 12/2013 | Cecinas | B60N 2/20 297/216.1 |
| 2016/0047632 | A1* | 2/2016 | Berman | B60N 2/885 296/65.02 |

* cited by examiner

EXTENDED STROKE ENERGY ATTENUATOR

TECHNICAL FIELD AND BACKGROUND

The technical field of the present invention relates to energy attenuation technology for reducing the severity of shock loads experienced by vehicle occupants during high-energy impact events, and further to the incorporation of such technology in land vehicle, watercraft, and aircraft seating systems.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
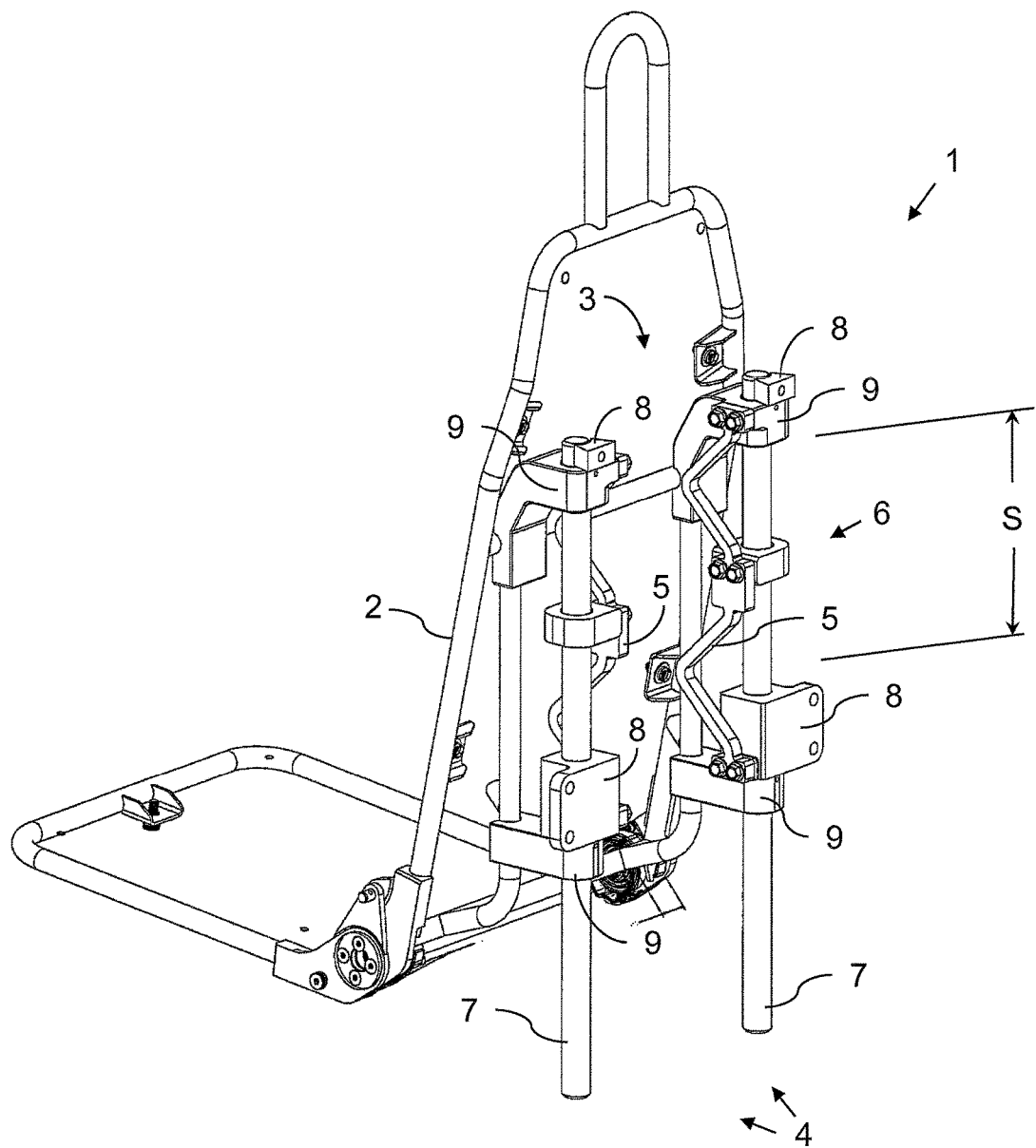
FIG. 1 is a perspective view of a vehicle seat incorporating an extended stroke energy attenuating system in accordance with the present disclosure.
Figure 2:
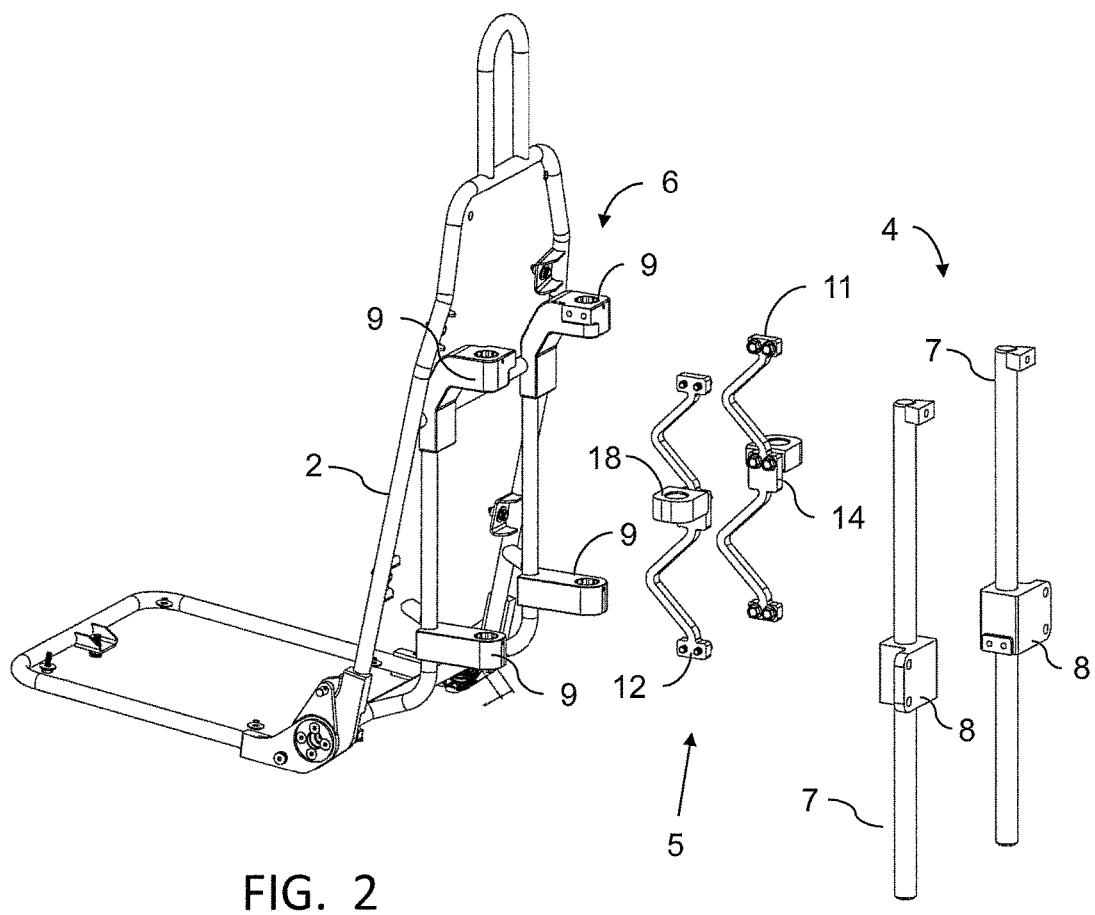
FIG. 2 is an exploded perspective view of the seat and energy attenuating system shown in FIG. 1.

An exemplary energy attenuating seating system in accordance with the present disclosure is indicated in the drawing Figures at reference numeral 1. Referring initially to FIGS. 1 and 2, the seating system 1 comprises a vehicle seat 2, a seat guide apparatus 3, and an energy attenuating component 5. The seat guide apparatus 3 is configured to attach the seat 2 to a vehicle compartment structure, such as a sidewall or floor, while allowing the seat to freely move (or stroke) in a substantially vertical direction. The seat is prevented from simply falling by the energy attenuating component 5, which serves to support the seat under normal circumstances, and to control or modulate inertia-caused motion (or "deflection") of the seat during a high energy impact event.

The seat guide apparatus 3 may be any type of mechanism that secures the seat to the vehicle and constrains seat motion to a substantially linear or vertical path. The apparatus may comprise a guided sliding arrangement wherein the seat is moveably attached to a rigid guide track 4 configured for secure attachment to a vehicle compartment. The rigid guide track defines a seat stroke path, wherein the seat is connected at a sliding attachment 6 that constrains the seat to follow the stroke path.

In the depicted embodiment for example, the guide track 4 comprises left and right parallel guide bars 7, and is adapted with upper and lower bolted mounting brackets 8 for securely attaching the bars to the vehicle. The sliding attachments 6 are left and right pairs of upper and lower guide bushings 9 that are attached to or integrated with the seat or seat frame, such that the seat and bushings 9 slide on the guide bars 7 together as a unit.

The upper and lower guide bushings 9 of each pair are vertically separated from one another by a bushing spacing "S". The spacing S determines the amount of seat stroking distance available for an impact event, as well as the moment arm length for reacting torque loads applied by the seat to the bars 7. Increasing this spacing acts to increase both the available stroking distance and the moment arm length; and increasing the moment arm length reduces the bearing loads at the bushings, and the tendency of the bushings to bind on the parallel bars. In one embodiment the spacing S is selected to provide enough moment arm length to prevent excessive binding of the bushings under high energy impact loading conditions.

The orientation of guide track 4 determines the direction of the sliding motion. In the case of generally vertically directed threats such as an explosion under a land vehicle or an aircraft slam down event, the guide track is preferably oriented to produce a substantially vertical sliding motion. However, other guide orientations and seat motion directions may be preferable in some circumstances, or for certain types of vehicles.

In addition to the above-described embodiment, various other configurations for producing guided seat motion are possible and considered equivalents of guide apparatus 3 within the scope of the present disclosure. For example, the operation of sliding attachments 6 and guide track 4 may be reversed, with the guide track attached to and moveable with the seat, and the sliding attachments fixed to the vehicle structure. Additional equivalent arrangements are disclosed in U.S. Pat. Nos. 8,678,465, 8,550,553, and 9,132,753, all of which are assigned to the assignee of the present disclosure, and all hereby incorporated by reference.

In one particular alternative equivalent embodiment disclosed in U.S. patent application Ser. No. 15/276,413, also assigned to the assignee of the present disclosure and hereby incorporated by reference, guided motion is produced by a linkage arrangement connecting the seat to the vehicle compartment so that the seat essentially swings instead of sliding. The patent application describes a seat supported by left and right pairs of pivoting arms in a configuration similar to a double wishbone design used in automobile suspensions. The disclosed linkage is configured such that the seat moves by translating without rotating along an arcuate and substantially vertical path.

Under normal conditions, or in other words in the absence of the type of catastrophic vertical acceleration associated with an under-vehicle explosion or an aircraft slam down (generally "impact event", or "high energy impact event"), the seat 2 is held in place and prevented from simply sliding or swinging downward by rigid energy attenuating ("EA") components 5. The EA components extend between the seat and vehicle, with an upper end 11 of each component 5 attached to and movable with the seat, and a lower end 12 attached to the vehicle compartment. The upper ends 11 may be attached to the seat, for example, via upper seat guide bushings 9, and the lower ends 12 attached to the vehicle via lower mounting brackets 8.

In the embodiment shown there are two identical EA components, one associated with each side (left and right) of guide apparatus 3, although there could be more than or less than the two depicted EA components. For example, there could be one centrally located EA component, or alternatively two on the left side and two right for a total of four. The upper and lower ends 11, 12 may comprise wide flanges as shown that attach to the guide bushings with two or more bolts, such that the bushings provide a moment restraint preventing the ends of the EA components from rotating during an impact event, and in that respect forcing substantially all of the deformation to occur in the attenuation zones.

Each EA component 5 further includes an intermediate point or flange 14 between ends 11 and 12. The intermediate points are configured for guided motion along the stroking path followed by the seat. In the depicted embodiment the intermediate points 14 are slidably connected to the guide tracks 4 with sliding intermediate attachments 18 that constrain the intermediate points to move along the same seat stroke path as the upper ends 11 of the EA components. The intermediate attachments 18 may be separate pieces that are bolted to the EA components at the intermediate points as shown, or integral with the EA components doubling as flanges and bushings for example. In either case the intermediate attachments also act as a moment restraint, preventing the intermediate points of the EA components from rotating, and further confining EA component deformation to the attenuation zone regions between the intermediate point and EA component ends 11, 12.

The EA components 5 comprise metal constructions that are rigid and strong enough to support the weight and G-loads of an occupied seat while the load is below a predetermined threshold value, yet capable of deforming in a controlled manner and absorbing the energy of an impact event that produces shock loads above the threshold value. The EA components absorb energy through plastic (or permanent) deformation of the metal, and may comprise any generally rigid, non-brittle metal, such as brass, aluminum, steel, and alloys thereof. For example, in one particular embodiment the EA members are made of a high strength aluminum alloy such as 6061-T6.

Figure 3:
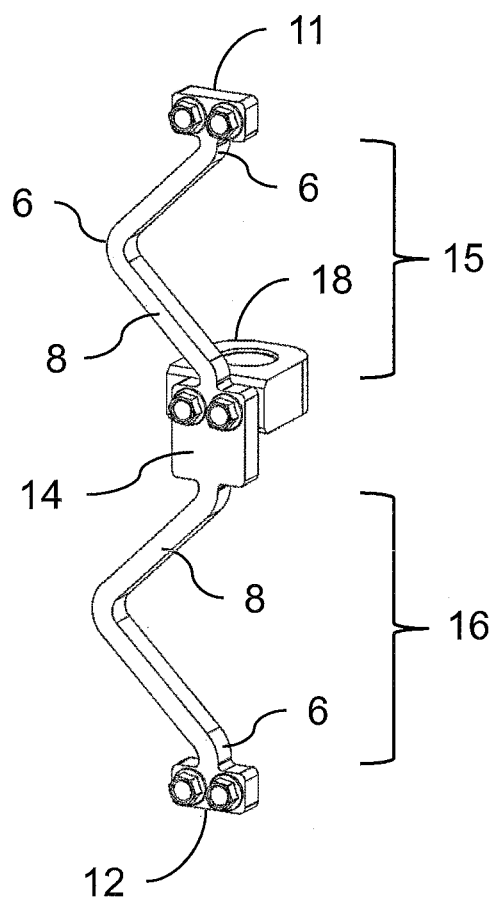
FIG. 3 is a perspective view of an energy attenuating component of the energy attenuating system of FIG. 1.

Referring now to FIG. 3, each EA component 5 comprises a first attenuation zone 15 between the upper end 11 and the intermediate flange 14, and a second attenuation zone 16 between the intermediate flange 14 and the lower end 12. In the depicted embodiment each attenuation zone is an elongated bar formed in a sideways letter "V" shape, with bends, or angles 19 at each end and in the middle, separated by straight sections 20. Additional angled bar type EA component and EA "link" embodiments are disclosed for example in U.S. Pat. Nos. 7,938,485, 8,403,410, 8,678,465, and D657,312, all of which are assigned to the assignee of the instant invention, and hereby incorporated by reference. Alternatively, the EA members and attenuation zones may comprise any other crushable or extensible EA structure known in the art, such as crush tubes, inversion tubes, tube expansion, wire bender, metal shearing or tearing devices, and the like.

The attenuation zones may be custom tailored to any particular application by modifying material properties, thicknesses, and/or shapes. In one exemplary implementation the EA components are configured to effectively attenuate a vertical impact of a 6.5 meters-per-second impulse due to an under-vehicle explosion such as a mine blast, and fully attenuate road shock loads transmitted through a vehicle chassis structure of at least 10 G's vertical, while supporting a 95th weight percentile seat occupant.

In addition, the attenuation zones may be configured to produce a certain reaction, or a certain reaction sequence to an impact event. For example, it may be desirable for EA component 5 to provide a resisting force during an impact event that is substantially uniform over the entire seat stroke. In such an application both the upper and lower attenuation zones may be configured identically to one another so as to deform at the same time and by the same amount during an impact event, behaving in that regard as one elongated crushable member.

Alternatively, in other applications, or for other anticipated loading scenarios, it may be desirable for EA component 5 to resist the seat load with a non-uniform, or staged reaction force. In such applications the shape and/or mechanical properties of the upper attenuation zones may be intentionally differentiated from those of the lower attenuation zones, to produce a first threshold load for the upper attenuation zones and a second threshold load for the lower attenuation zones. For example, the cross-sectional area of the EA component in the upper attenuation zone could be less than the cross-sectional area in the lower attenuation zone, resulting in the upper attenuation zone having a lower threshold load.

In such an arrangement the dimensions may be tailored so that the upper attenuation zone crushes completely without exceeding the threshold of the lower attenuation zone. If the impact event energy is completely absorbed in the process, the seat motion may be arrested in a single stage, without any permanent deformation of the lower attenuation zone. On the other hand, if the impact event energy is not completely absorbed by the attenuation zone with the lower threshold load (the upper attenuation zone in the present example), and enough energy remains to exceed the threshold load of the other attenuation zone (the lower attenuation zone in the present example), further deformation may ensue in a second stage of the energy attenuation process.

Figure 4:
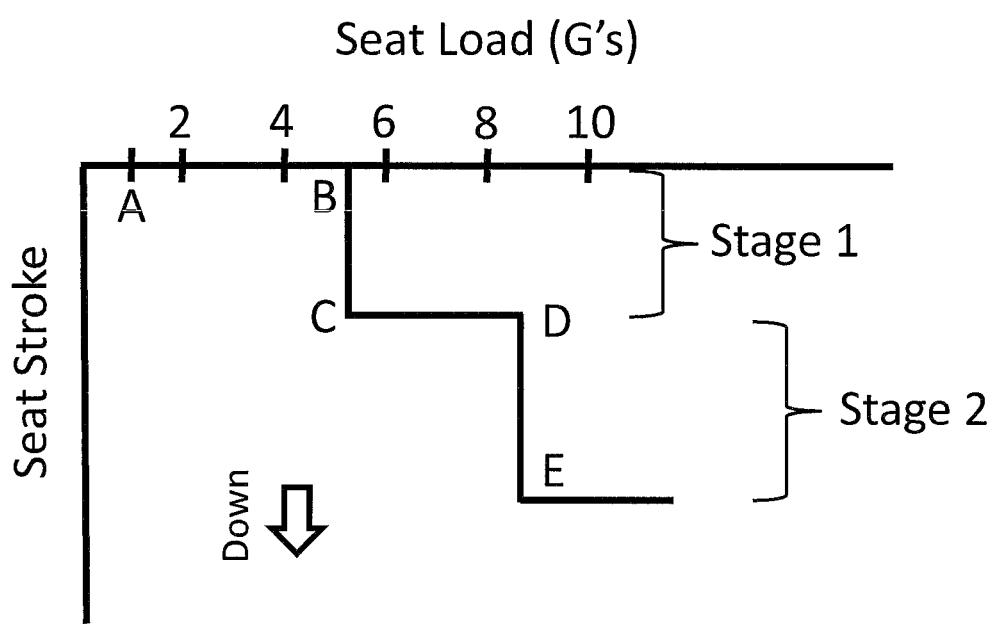
FIG. 4 is a load versus deflection diagram illustrating a multi-stage energy attenuation process.

FIG. 4 schematically illustrates such a two-stage energy attenuation process. Upon initiation of an impact event, the seat reaction load (horizontal axis) supported by the EA components begins to increase, from an initial static baseline value at A to a first stage threshold value at B. Between A and B there is no permanent deformation of the EA components, and effectively no seat stroking (or "deflection"). At point B the attenuation zone with the lower relative threshold load (or "first stage zone") begins to permanently deform and attenuate event energy while maintaining a substantially constant reaction load as the seat strokes downward. Assuming sufficient event energy, the deformation continues until the first stage zone is completely crushed and bottomed out at point C.

Still assuming sufficient energy for the impact event to continue, the reaction load will again increase without further EA component deformation or seat stroking from the value at C to the threshold load of the attenuation zone with the higher relative threshold load (or "second stage zone") at point D. From point D the second stage zone begins to deform and attenuate energy while maintaining a substantially uniform, but higher reaction load than at point B. The deformation will continue to an end point E, when the second stage zone has completely crushed and bottomed out, or when the remainder of the event energy has been absorbed, whichever happens first.

Although a nonlinear, staged embodiment has been described above in terms of two stages, it should be appreciated that additional stages are possible and within the scope of the present disclosure. For example, the EA component may comprise three attenuation zones, each with a different threshold load. It should be further appreciated that the lengths of the individual attenuation zones may all be the same or vary from one another.

Figure 5:
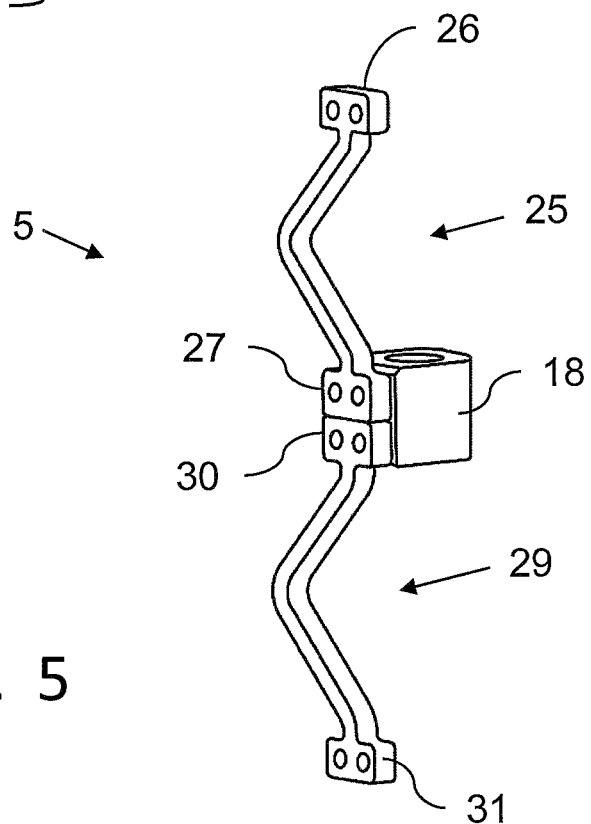
FIG. 5 is a perspective view of an energy attenuating component of the energy attenuating system, with serially arranged first and second energy attenuating members.

In addition, instead of comprising one contiguous member, the EA component may have a modular construction. Referring to FIG. 5, an EA component 5 is constructed in two serially arranged parts, with a first EA member 25 extending from an upper end 26 to a lower end 27, and a second, separate EA member 29 extending from an upper end 30 to a lower end 31. The lower end 27 of the first EA member 25 and the upper end 30 of the second EA member 29 are both attached to the sliding intermediate attachment 18, as was the intermediate point 14 in the previously described embodiment, together becoming the guided intermediate point of the EA component. The depicted modular configuration allows for removing and replacing the individual EA members as needed to achieve a desired load response, or to replace a damaged or partially deformed EA member for example. Again, although two EA members are shown, a modular EA component may comprise instead three or more separate portions or EA members, with an additional sliding track attachment at each additional juncture between the EA members.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. For example, instead of being positioned behind and extending away from the back of the seat, the mounting system 1 could instead extend from a side of the seat to an adjacent vehicle compartment side wall or column. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating vehicle seating system configured to attenuate shock loads imparted through a vehicle compartment to a seat occupant during a high energy impact event, the seating system comprising:
    a seat configured for guided motion relative to a vehicle compartment over a stroking distance from a starting position at a first height to an ending position at a second height below the first height; and
    an energy attenuating component with a first end attached to the seat, a second end configured for attachment to the vehicle compartment, and an intermediate point configured for guided motion relative to the vehicle compartment,
    a first attenuation zone between the first end and the intermediate point of the energy attenuating component comprising a first deformable metal bar extending from an upper flange at the first end to an intermediate flange at the intermediate point; and
    a second attenuation zone between the intermediate point and the second end of the energy attenuating component comprising a second deformable metal bar extending from the intermediate flange to a lower flange at the second end of the energy attenuating component, the first and second deformable metal bars each having a letter V shape with bends at the middle and ends of the bars and straight sections between the bends, wherein the energy attenuating component is configured to remain rigid and prevent the seat from moving as long as a magnitude of any shock load imparted to the seat through the energy attenuating component is less than a predetermined threshold value, and to deform in a progressive, predictable manner in response to a shock load exceeding the threshold value, thereby allowing the seat to stroke from the starting position toward the ending position as the energy attenuating component deforms and attenuates energy.

2. The vehicle seating system of claim 1, further comprising a guide track configured for secure attachment to a vehicle compartment, wherein the guide track defines a seat stroke path, and wherein the seat is moveably constrained to the guide track at upper and lower sliding attachments that allow seat movement only along the stroke path.

3. The vehicle seating system of claim 2, wherein the intermediate point of the energy attenuating component is moveably attached to the guide track between the upper and lower sliding attachments at an intermediate sliding attachment that constrains the intermediate point of the energy attenuating component to move only along the stroke path.

4. The vehicle seating system of claim 3, wherein the guide track comprises left and right parallel bars, and the sliding attachments comprise left and right pairs of upper, lower, and intermediate bushings slidably disposed on the respective left and right parallel bars.

5. The vehicle seating system of claim 4, wherein the energy attenuating component comprises a left and right pair of energy attenuating components, and wherein respective left and right intermediate attachments provide a moment restraint preventing the intermediate points of the left and right energy attenuating components from rotating.

6. The vehicle seating system of claim 1, wherein the energy attenuating component comprises separate first and second energy attenuating members, and wherein the first end of the energy attenuating component is an upper end of the first energy attenuating member, the second end of the energy attenuating component is a lower end of the second energy attenuating member, and the intermediate point of the energy attenuating component is a lower end of the first energy attenuating member and an upper end of the second energy attenuating member.

7. The vehicle seating system of claim 6, wherein a threshold load value of the first energy attenuating member is unequal to a threshold load value of the second energy attenuating member.

8. The vehicle seating system of claim 1, wherein a threshold load value of the first attenuation zone is unequal to a threshold load value of the second attenuation zone.

9. An energy attenuating vehicle seating system configured to attenuate shock loads imparted through a vehicle compartment to a seat occupant during a high energy impact event, the seating system comprising:
a seat configured for guided motion relative to a vehicle compartment over a stroking distance from a starting position at a first height to an ending position at a second height below the first height;
an energy attenuating component comprising serially arranged first and second energy attenuating members, the first energy attenuating member comprising a first deformable metal bar with an upper end attached to the seat and a lower end constrained to move along the stroke path, and the second energy attenuating member comprising a second deformable metal bar with an upper end constrained to move along the stroke path, and a lower end configured for attachment to the vehicle compartment, the first and second deformable metal bars each having a letter V shape with bends at the middle and ends of the bars and straight sections between the bends, wherein the energy attenuating component is configured to remain rigid and prevent the seat from moving as long as a magnitude of any shock load imparted to the seat through the energy attenuating component is less than a predetermined threshold value, and to deform in a progressive, predictable manner in response to a shock load exceeding the threshold value, thereby allowing the seat to stroke from the starting position toward the ending position as one or both energy attenuating members deform.

10. The vehicle seating system of claim 9, wherein a load threshold value of the first energy attenuating member is unequal to a load threshold value of the second energy attenuating member.

11. The vehicle seating system of claim 9, further comprising a guide track configured for secure attachment to a vehicle compartment, wherein the guide track defines the seat stroke path, and wherein the seat is moveably constrained to the guide track at upper and lower sliding attachments that allow seat movement only along the stroke path.

12. The vehicle seating system of claim 11, wherein the lower end of the first energy attenuating member and the upper end of the second energy attenuating member cooperatively define an intermediate point of the energy attenuating component, and are moveably attached to the guide track between the upper and lower sliding attachments with an intermediate sliding attachment that is constrained to move only along the stroke path.

13. The vehicle seating system of claim 12, wherein the guide track comprises left and right parallel bars, and the sliding attachments comprise left and right pairs of upper, lower, and intermediate bushings slidably disposed on the respective left and right parallel bars.

14. The vehicle seating system of claim 13, wherein the energy attenuating component comprises a left and right pair of energy attenuating components, and wherein respective left and right intermediate sliding attachments provide a moment restraint preventing the intermediate points of the left and right energy attenuating components from rotating.

* * * * *